(12) United States Patent
Berjot et al.

(10) Patent No.: US 12,565,321 B2
(45) **Date of Patent: \*Mar. 3, 2026**

(54) FRONT ENGINE ATTACHMENT SYSTEM INTENDED FOR AN AIRCRAFT ENGINE AND HAVING A COMPACT STRUCTURE

(71) Applicant: Airbus Operations SAS, Toulouse (FR)

(72) Inventors: Michael Berjot, Toulouse (FR); Rémi Lansiaux, Toulouse (FR); Jean-Baptiste Vignes, Toulouse (FR)

(73) Assignee: AIRBUS OPERATIONS SAS, Toulouse (FR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/755,025

(22) Filed: Jun. 26, 2024

(65) Prior Publication Data

US 2025/0002165 A1 Jan. 2, 2025

(30) Foreign Application Priority Data

Jun. 28, 2023 (FR) ...................................... 2306780

(51) Int. Cl.
B64D 27/40 (2024.01)
B64D 27/18 (2006.01)

(52) U.S. Cl.
CPC ........... B64D 27/404 (2024.01); B64D 27/18 (2013.01); B64D 27/406 (2024.01)

(58) Field of Classification Search
CPC .... B64D 27/404; B64D 27/406; B64D 27/18; B64D 27/402

(Continued)

(56) References Cited

U.S. PATENT DOCUMENTS 3,561,707 A * 2/1971 Strock .................. B64D 27/402
                                        248/554
4,079,981 A * 3/1978 Mahler ................ B64D 27/406
                                        244/54

(Continued)

FOREIGN PATENT DOCUMENTS

CN          119284180 A  *  1/2025  ........... B64D 27/404
EP            1473441 A2 * 11/2004  ........... B64D 27/402

(Continued)

OTHER PUBLICATIONS

French Search Report for corresponding French Patent Application No. 2306780 dated Dec. 5, 2023.

*Primary Examiner* — Taylor Morris
(74) *Attorney, Agent, or Firm* — Greer, Burns & Crain, Ltd.

(57) ABSTRACT

A system for attaching a front engine of an aircraft, having: a vertical median plane, an engine pylon with a nose having a main female clevis, and a cylindrical housing around a vertical axis, a main link fastened to a front casing of the engine by a secondary ball-joint connection about a secondary axis perpendicular to the median plane by a secondary shaft, a main shaft, perpendicular to the median plane and forming a main ball-joint connection of the main link in the main female clevis about a main axis, the main and secondary axes in the plane perpendicular to the median plane, and an outer cylinder, coaxial with the vertical axis and a first end of which fastened in the cylindrical housing and a second end of which mounted, via an annular linear connection, around the vertical axis with respect to the front casing.

7 Claims, 6 Drawing Sheets

(58) Field of Classification Search
USPC ........................................................ 248/554
See application file for complete search history.

(56) References Cited

U.S. PATENT DOCUMENTS

| | | | | | |
|---|---|---|---|---|---|
| 5,277,382 | A | * | 1/1994 | Seelen | B64D 27/404 |
| | | | | | 244/54 |
| 5,474,258 | A | | 12/1995 | Taylor et al. | |
| 5,620,154 | A | * | 4/1997 | Hey | F02C 7/20 |
| | | | | | 60/797 |
| 5,649,417 | A | * | 7/1997 | Hey | B64D 27/402 |
| | | | | | 244/54 |
| 6,330,995 | B1 | * | 12/2001 | Mangeiga | B64D 27/404 |
| | | | | | 244/54 |
| 6,474,596 | B1 | * | 11/2002 | Cousin | B64D 27/404 |
| | | | | | 244/54 |
| 6,682,015 | B2 | * | 1/2004 | Levert | F02C 7/20 |
| | | | | | 244/54 |
| 7,165,743 | B2 | * | 1/2007 | Pasquer | B64D 27/404 |
| | | | | | 60/797 |
| 7,267,301 | B2 | * | 9/2007 | Dron | B64D 27/406 |
| | | | | | 244/54 |
| 7,350,747 | B2 | * | 4/2008 | Machado | B64D 27/40 |
| | | | | | 244/54 |
| 7,451,947 | B2 | * | 11/2008 | Machado | B64D 27/12 |
| | | | | | 60/797 |
| 7,527,220 | B2 | * | 5/2009 | Dron | B64D 27/404 |
| | | | | | 244/54 |
| 8,714,033 | B2 | * | 5/2014 | Foster | F16B 31/028 |
| | | | | | 244/54 |
| 8,757,579 | B2 | * | 6/2014 | Bonnet | F16F 7/125 |
| | | | | | 244/54 |
| 8,794,568 | B2 | * | 8/2014 | Lafont | B64D 27/18 |
| | | | | | 244/54 |
| 8,985,509 | B2 | * | 3/2015 | Sandy | B64D 27/406 |
| | | | | | 60/797 |
| 9,248,921 | B2 | * | 2/2016 | West | B64D 27/404 |
| 9,664,112 | B2 | * | 5/2017 | Balk | B64D 27/18 |
| 11,345,480 | B2 | * | 5/2022 | Mertes | F02C 7/20 |
| 11,440,635 | B1 | * | 9/2022 | Kandavalli | B64D 27/404 |
| 11,702,216 | B2 | * | 7/2023 | Berjot | B64D 27/406 |
| | | | | | 244/54 |
| 11,975,856 | B2 | * | 5/2024 | Berjot | B64D 27/404 |
| 2009/0108127 | A1 | | 4/2009 | Cazals | |
| 2010/0090056 | A1 | | 4/2010 | Gardes et al. | |
| 2010/0147996 | A1 | | 6/2010 | Hartshorn et al. | |
| 2011/0266389 | A1 | * | 11/2011 | Combes | B64D 27/402 |
| | | | | | 244/54 |
| 2015/0166189 | A1 | * | 6/2015 | Cassagne | B64D 27/40 |
| | | | | | 244/54 |
| 2018/0118357 | A1 | * | 5/2018 | Yasuda | F02C 7/32 |
| 2019/0161198 | A1 | * | 5/2019 | Combes | F16C 11/0614 |
| 2019/0202572 | A1 | * | 7/2019 | Pautis | B64D 27/402 |
| 2020/0361618 | A1 | * | 11/2020 | Vayssieres | F02C 7/20 |
| 2021/0010424 | A1 | * | 1/2021 | West | F02C 7/20 |
| 2021/0354839 | A1 | * | 11/2021 | Pautis | B64D 27/404 |
| 2022/0033098 | A1 | | 2/2022 | Frenot et al. | |
| 2022/0340293 | A1 | * | 10/2022 | Berjot | B64D 27/402 |
| 2025/0002166 | A1 | * | 1/2025 | Berjot | B64D 27/12 |
| 2025/0197017 | A1 | * | 6/2025 | Berjot | B64D 27/404 |

FOREIGN PATENT DOCUMENTS

| | | | | | |
|---|---|---|---|---|---|
| EP | 1814783 | B1 | | 5/2008 | |
| EP | 3945032 | A1 | | 2/2022 | |
| FR | 3074146 | A1 | * | 5/2019 | ......... F16C 11/0614 |
| FR | 3093546 | A1 | * | 9/2020 | ........... B64D 27/404 |
| FR | 3096028 | A1 | * | 11/2020 | ........... B64D 27/404 |
| FR | 3098793 | A1 | | 1/2021 | |
| FR | 3103788 | A1 | | 6/2021 | |
| GB | 2119857 | A | | 11/1983 | |
| WO | 9311041 | A1 | | 6/1993 | |

* cited by examiner

FRONT ENGINE ATTACHMENT SYSTEM INTENDED FOR AN AIRCRAFT ENGINE AND HAVING A COMPACT STRUCTURE

CROSS-REFERENCES TO RELATED APPLICATIONS

This application claims the benefit of French Patent Application Number 2306780 filed on Jun. 28, 2023, the entire disclosure of which is incorporated herein by way of reference.

FIELD OF THE INVENTION

The present invention relates to a front engine attachment system for an aircraft engine in which the front engine attachment system is compact, and to an aircraft having at least one such front engine attachment.

BACKGROUND OF THE INVENTION

An aircraft conventionally has at least one engine, in particular a jet engine. Beneath each wing, and for each engine, the aircraft has an engine pylon that is fastened to the structure of the wing and that extends below the wing, and the engine is suspended beneath the engine pylon.

The engine is housed in a nacelle and fastened to the engine pylon by way of an engine attachment system comprising a front engine attachment and a rear engine attachment.

There are numerous types of front engine attachment that are satisfactory from the point of view of their current use. However, the fans of new engines are increasingly large so as to improve the performance of the engines, and this correspondingly reduces the distance between the nacelle and the ground.

It is then necessary to define a new arrangement that makes it possible to reduce the height of the front engine attachment so as to move the nacelle away from the ground and consequently to bring the nacelle closer to the wing.

SUMMARY OF THE INVENTION

One object of the present invention is to propose a front engine attachment system that incorporates the engine pylon and the front engine attachment so as to reduce the height of the assembly.

To this end, a front engine attachment system for an engine of an aircraft is proposed, the front engine attachment system having a vertical median plane and having:

- an engine pylon having, at a front part, a nose having a main female clevis and a cylindrical housing around a vertical axis,
- a main link intended to be fastened to a front casing of the engine by a secondary ball-joint connection about a secondary axis perpendicular to the median plane by way of a secondary shaft,
- a main shaft, which is perpendicular to the median plane and establishes a main ball-joint connection of the main link in the main female clevis about a main axis, wherein the main axis and the secondary axis are in the same vertical plane perpendicular to the median plane, and
- an outer cylinder, which is coaxial with the vertical axis and a first end of which is fastened in the cylindrical housing and a second end of which is intended to be mounted, via an annular linear connection, around the vertical axis with respect to the front casing.

Such a front engine attachment system has reduced vertical bulk since the front engine attachment is incorporated in the engine pylon.

Advantageously, the main axis is arranged in front of the vertical axis.

Advantageously, the main link is intended to be fastened to a second female clevis of the front casing by a pivot connection about a pivot axis perpendicular to the median plane, the front engine attachment system has a second shaft establishing the pivot connection, and the second shaft is mounted with clearance in a bore in the main link and intended to be mounted with a tight fit in the bores in the second female clevis.

According to one particular embodiment, the front engine attachment system has an inner cylinder that is inserted into and fastened in the outer cylinder.

According to another particular embodiment, the nose has two lateral stops, which are arranged respectively on the port side and on the starboard side of the outer cylinder and are intended to come between two lateral counter-stops of the front casing.

Advantageously, the front engine attachment system has two lateral links arranged respectively on the port side and on the starboard side of the main link, and each lateral link is mounted on the main shaft with a tight fit and on the secondary shaft with clearance.

Advantageously, the main shaft consists of a peripheral shaft, which is hollow, and of an inner shaft, which is housed in the peripheral shaft.

The invention also proposes an aircraft having a structure, an engine with a front casing and a front engine attachment system according to one of the preceding variants, wherein the main link is fastened to the front casing by the secondary ball-joint connection and wherein the second end of the outer cylinder is mounted, via the annular linear connection, around the vertical axis with respect to the front casing.

BRIEF DESCRIPTION OF THE DRAWINGS

The above-mentioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
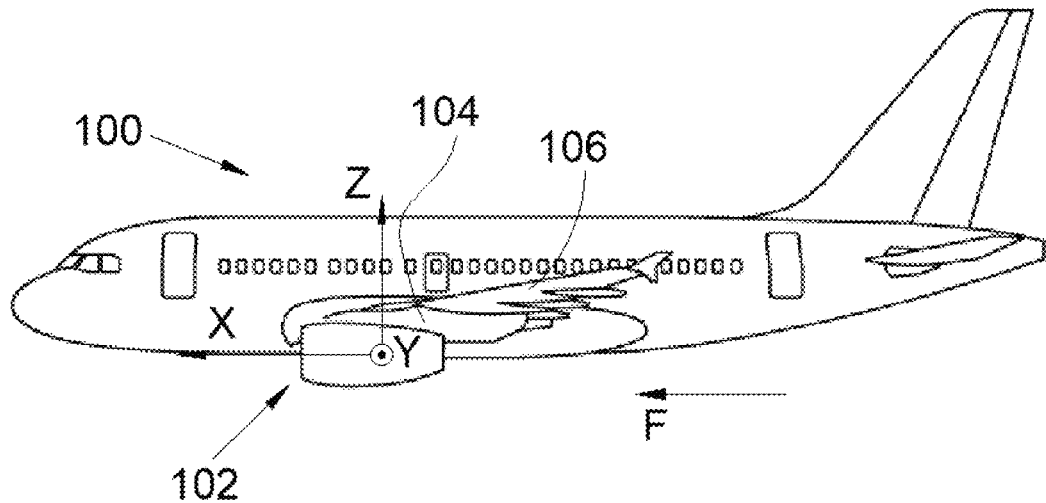
FIG. 1 is a side view of an aircraft according to the invention.

In the following description, terms relating to a position are considered in relation to an aircraft in a position of forward movement, i.e. as shown in FIG. 1, in which the arrow F represents the direction of forward movement.

FIG. 1 shows an aircraft 100 that has an engine 102, in particular a jet engine that is fastened beneath an engine pylon 104 that is itself fastened beneath a wing 106.

In the following description, and by convention, X denotes the longitudinal direction of the engine 102, with positive orientation in the direction of forward movement of the aircraft 100, Y denotes the transverse direction of the engine 102, which is horizontal when the aircraft 100 is on the ground, and Z denotes the vertical direction or vertical height when the aircraft 100 is on the ground, these three directions X, Y and Z being mutually orthogonal.

The engine 102 has a general shape exhibiting symmetry of revolution about the longitudinal axis X.

In the embodiment of the invention presented in FIG. 1, the aircraft 100 has one engine 102 beneath each wing 106 of the aircraft 100, but it is possible to provide a plurality of engines beneath each wing 106.

Figure 2:
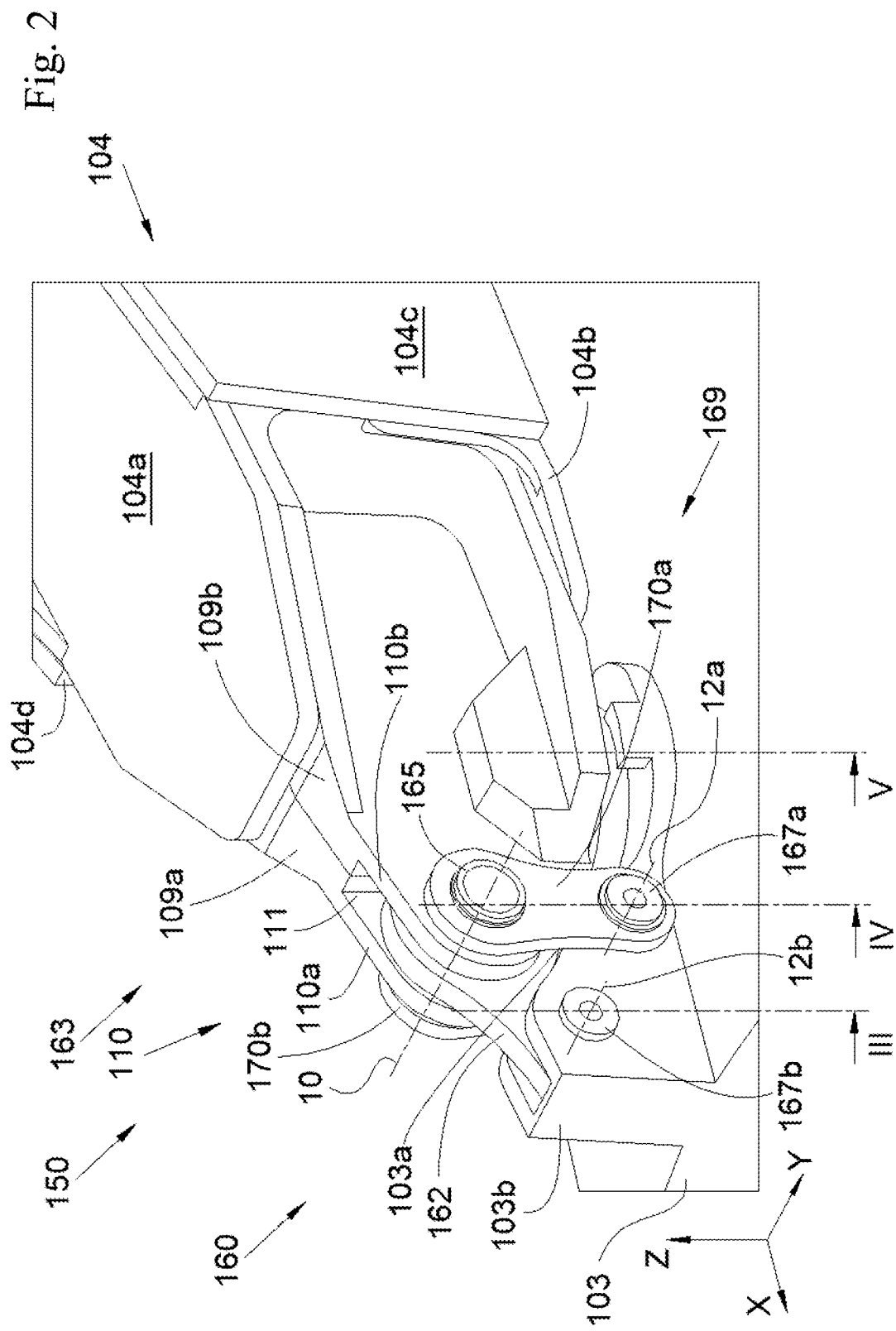
FIG. 2 is a perspective view of a front engine attachment system according to the invention.

FIG. 2 shows a front engine attachment system 150 that is fastened to the structure of the aircraft 100, in this case the structure of the wing 106, and extends beneath the wing 106 and supports the engine 102 and in particular the front part of the engine 102. FIGS. 2 to 5 show various views of the front engine attachment system 150.

The front engine attachment system 150 comprises the engine pylon 104, which is fastened to the structure of the wing 106, and a front engine attachment 160, which is fastened between the engine pylon 104 and a front casing 103 secured to the engine 102. The front engine attachment system 150 has a vertical median plane XZ.

Conventionally, a rear engine attachment is fastened between the engine pylon 104 and a rear part of the engine 102 and it can take any form known to those skilled in the art.

The engine pylon 104 takes the form of a box that has, inter alia, at a front part 163, a nose 110 that has a main female clevis 111 consisting of two walls 110a-b that are parallel to one another and vertical, i.e. parallel to the median plane XZ and therefore perpendicular to the transverse direction Y. As specified below, the main female clevis 111 makes it possible to install a link that is mounted so as to be free to rotate in the main female clevis 111 about a main axis 10 oriented transversely, i.e. perpendicularly to the median plane XZ and therefore horizontally so as to establish a ball-joint connection referred to as main ball-joint connection, a main rotational axis of which is the main axis 10 and wherein the rotations about the other two axes are of reduced amplitude.

In the embodiment of the invention presented in FIGS. 2 to 6, the nose 110 consists of two fittings 109a-b fastened to one another at the median plane XZ, and each wall 110a-b constituting the main female clevis 111 belongs to one of the fittings 109a-b and the two walls 110a-b are in this case symmetrical with respect to the median plane XZ.

Figure 4:
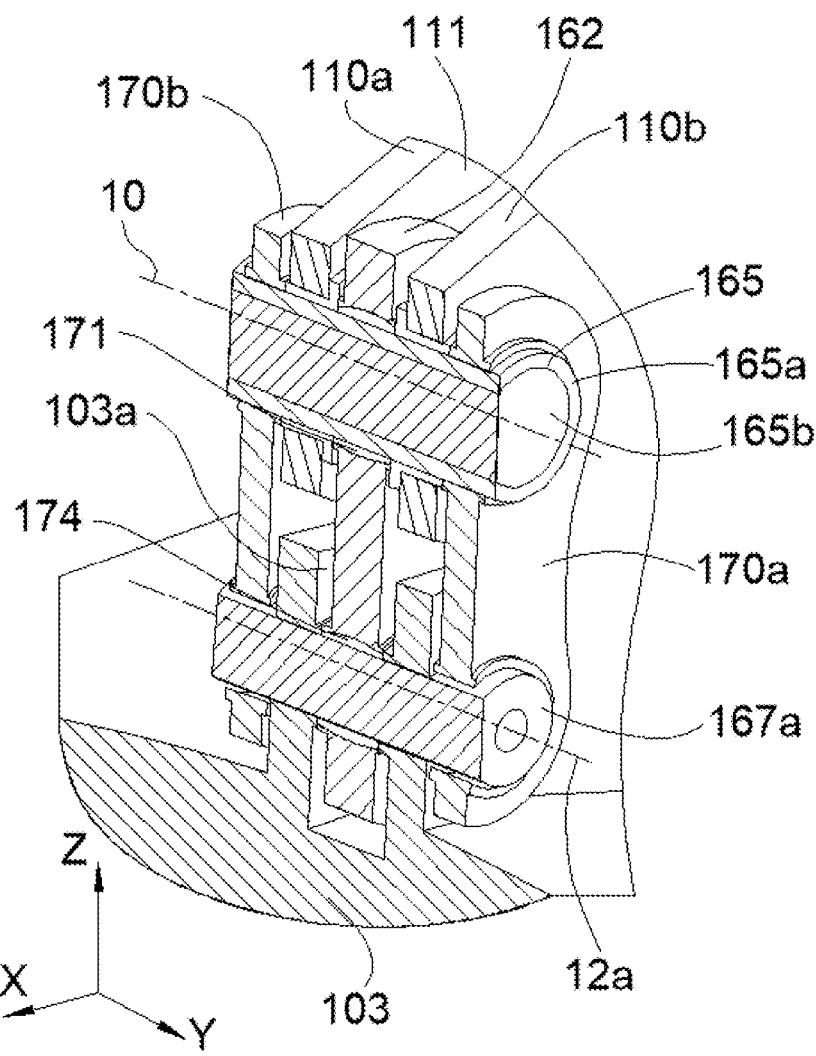
FIG. 4 is a perspective view of a cross section of the front engine attachment system according to the invention along the line IV in FIG. 2.

FIG. 4 shows a cross section through the main female clevis 111 and a first female clevis 103a.

The engine pylon 104 has an upper wall 104a, a lower wall 104b and two lateral walls 104c-d. The various walls 104a-d are secured to one another so as to form a box with a generally trapezoidal vertical cross section. The nose 110 is fastened at the front zone 163 of the engine pylon 104 by any known means, such as for example by welding or bolts. The front zone 163 corresponds to the front ends of the walls 104a-d.

The front engine attachment 160 has a main link 162 fastened to the nose 110 in the main female clevis 111. The main ball-joint connection of the main link 162 in the main female clevis 111 is established by a main shaft 165 that is equipped with a boss 171 on which the main link 162 is mounted in an articulated manner. The main shaft 165 passes through the two walls 110a-b forming the main female clevis 111 and the main link 162 through bores provided for this purpose. The main shaft 165 is thus perpendicular to the median plane XZ. The main axis 10 constitutes the axis of the main shaft 165.

The main link 162 is also fastened in an articulated manner to the front casing 103 by a secondary ball-joint connection, a main rotational axis of which is a secondary axis 12a that is perpendicular to the median plane XZ and therefore horizontal, and wherein the rotations about the other two axes are of reduced amplitude. To this end, the front casing 103 has the first female clevis 103a, which also consists of two walls that are parallel to one another and vertical, i.e. parallel to the median plane XZ and in this case symmetrical with respect to the median plane XZ. The main link 162 is fastened to the first female clevis 103a by a secondary shaft 167a that passes through the two walls forming the first female clevis 103a and the main link 162 through bores provided for this purpose. The secondary shaft 167a is thus perpendicular to the median plane XZ. The secondary axis 12a constitutes the axis of the secondary shaft 167a. The secondary ball-joint connection of the main link 162 to the front casing 103 is established by the secondary shaft 167, which is equipped with a boss 174 on which the main link 162 is mounted in an articulated manner.

The secondary axis 12a is vertically aligned with the main axis 10 and beneath the latter, i.e. the axis of the secondary shaft 167a and the axis of the main shaft 165 are in the same vertical plane perpendicular to the longitudinal direction X and therefore to the median plane XZ, or, in other words, the main axis of the main ball-joint connection, i.e. the main axis 10, and the main axis of the secondary ball-joint connection, i.e. the secondary axis 12a, are in the same vertical plane perpendicular to the median plane XZ.

In the embodiment of the invention presented in FIG. 4, the main link 162 is mounted with a tight fit via the bosses 171 and 174 on the main shaft 165 and on the secondary shaft 167a. The main shaft 165 is mounted inside the bores in the main female clevis 111 by way of rotary bearings. The secondary shaft 167a is mounted inside the bores in the first female clevis 103a with a tight fit.

Figure 5:
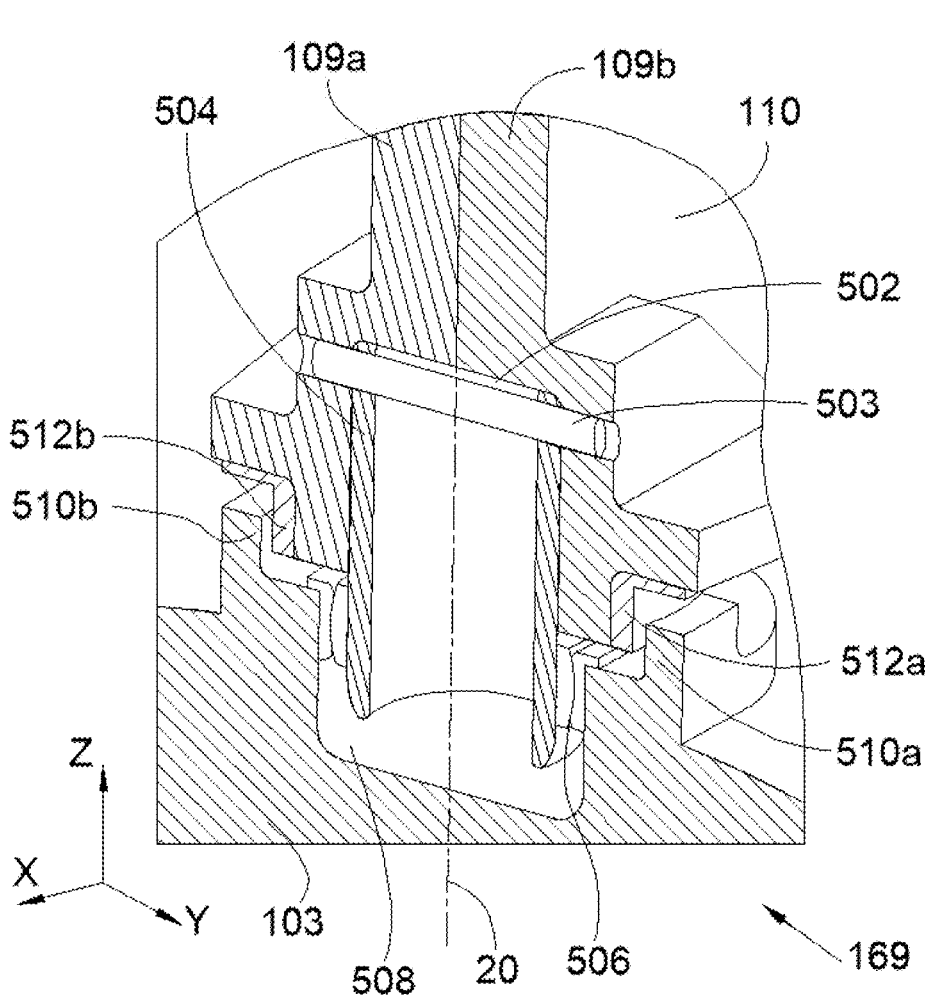
FIG. 5 is a perspective view of a cross section of the front engine attachment system according to the invention along the line V in FIG. 2.

FIG. 5 shows a cross section through an annular linear connection in which the translation axis is a vertical axis 20 that is also referred to as a "spigot connection" 169.

The nose 110 has a cylindrical housing or stud 502 coaxial with the vertical axis 20, which is therefore oriented vertically and in this case in the vertical median plane XZ.

The front engine attachment 160 also has an outer cylinder 504, a first end of which is fastened in the cylindrical housing 502 such that the outer cylinder 504 is coaxial with the vertical axis 20.

In the embodiment of the invention presented in FIG. 5, the first end of the outer cylinder 504 is fastened by installing a pin 503 that is driven into a bore that passes through the outer cylinder 504 and the nose 110. The axis of the pin 503 is in this case perpendicular to the vertical axis 20.

The second end of the outer cylinder 504 is mounted, via an annular linear connection, around the vertical axis 20 with respect to the front casing 103. There is therefore a ball-joint connection about a main axis that is the vertical axis 20 between the outer cylinder 504 and the front casing 103, and therefore between the nose 110 and the front casing 103. There is also a sliding connection, the direction of which is parallel to the vertical axis 20.

In the embodiment of the invention presented in FIG. 5, the ball-joint connection is established by installing a boss 506 that is mounted around the outer cylinder 504 and on which the front casing 103 is mounted in an articulated manner. The boss 506 is between the outer cylinder 504 and the front casing 103 in which a drilled hole 508 is formed in order to allow the boss 506 and the second end of the outer cylinder 504 to be installed.

The sliding connection is established between the cylindrical stud 502 and the boss 506, which is therefore mounted so as to be free to move in translation along the cylindrical stud 502 parallel to the vertical axis 20.

In the embodiment of the invention presented in FIG. 5, the outer cylinder 504 is solid.

Figure 6:
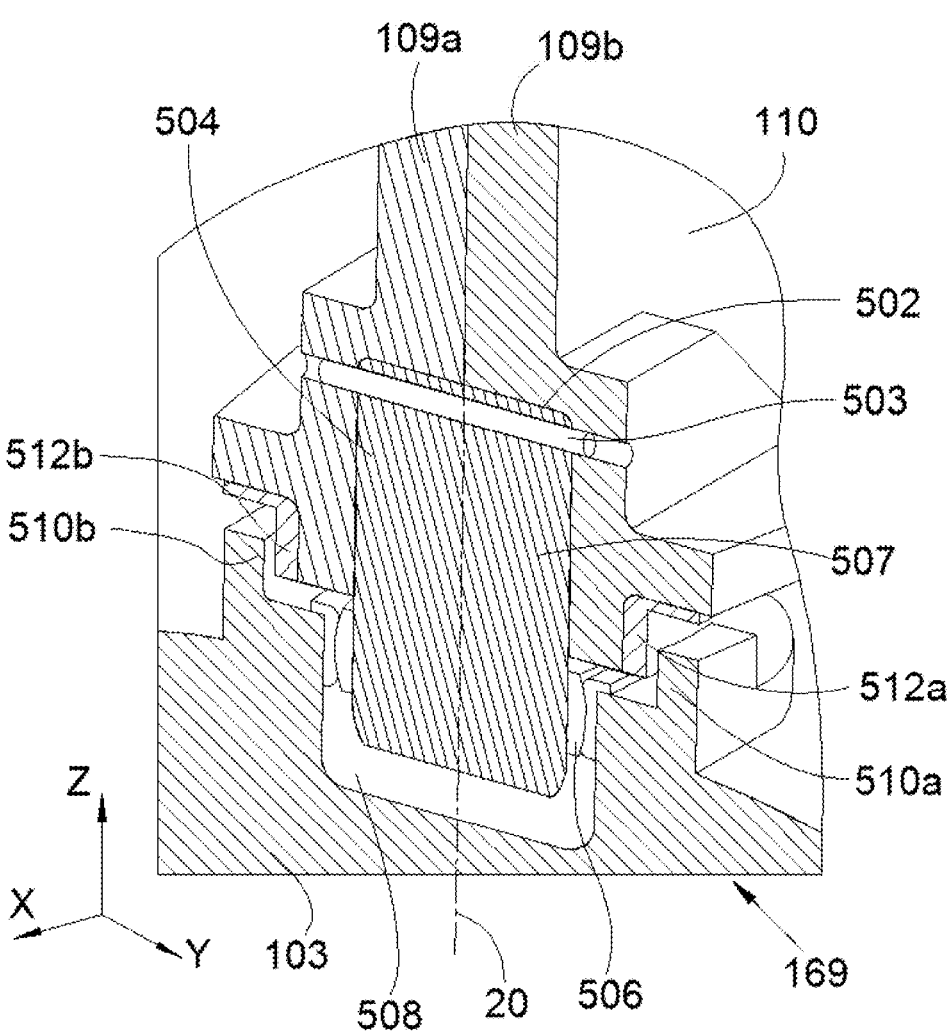
FIG. 6 is a view similar to FIG. 5 for a variant embodiment.

In the embodiment in FIG. 6, the outer cylinder 504 is hollow and the front engine attachment 160 also has an inner cylinder 505 that is inserted into and fastened in the outer cylinder 504. The inner cylinder 505 is therefore also coaxial with the vertical axis 20. The outer diameter of the inner cylinder 505 is smaller than the inner diameter of the outer cylinder 504, so as to create a space 507 between them, i.e. between the inside of the outer cylinder 504 and the outside of the inner cylinder 505. The difference in diameter is, for example, of the order of 0.6 mm to 2 mm and preferentially of 1 mm.

In the embodiment of the invention presented in FIG. 4, the first end of the outer cylinder 504 and the inner cylinder 505 are fastened by installing a pin 503 that is driven into a bore that passes through the outer cylinder 504, the inner cylinder 505 and the nose 110. The axis of the pin 503 is in this case perpendicular to the vertical axis 20.

The main female clevis 111 is arranged in front of the spigot connection 169 with respect to the longitudinal direction X, i.e. the main axis 10 of the main ball-joint connection is in front of the vertical axis 20.

With such an arrangement, the pylon 104 directly incorporates the elements ensuring the fastening of the engine 102 so as to reduce the height required for this fastening.

When the engine 102 is in operation, forces are generated and they are transmitted to the structure of the wing through the front casing 103 and the front engine attachment system 150, i.e. through the main link 162, the secondary shaft 167a, the main shaft 165, the spigot connection 169 and the engine pylon 104, which form a primary force path.

The forces in the Z direction are thus transmitted through the secondary ball-joint connection and the main ball-joint connection, i.e. vertically through the main link 162.

The forces in the X direction and in the Y direction are transmitted through the spigot connection 169.

For safety reasons, the front engine attachment system 150 also has means that ensure secondary force paths that compensate for failure of the primary force path, these means constituting backup safety means (or "waiting fail-safe" means).

Thus, according to one particular embodiment of the invention, the main link 162 is also fastened in an articulated manner to the front casing 103 by a pivot connection about a pivot axis 12b that is perpendicular to the median plane XZ and therefore horizontal. To this end, the front casing 103 has a second female clevis 103b, which consists in this case of two walls that are parallel to one another and vertical, i.e. parallel to the median plane XZ and are in this case the same walls as those of the first female clevis 103a. The main link 162 is fastened to the second female clevis 103b by a second shaft 167b that passes through the two walls forming the second female clevis 103b and the main link 162 through bores provided for this purpose in order to establish the pivot connection. The second shaft 167b is perpendicular to the median plane XZ. The pivot axis 12b constitutes the axis of the second shaft 167b.

Figure 3:
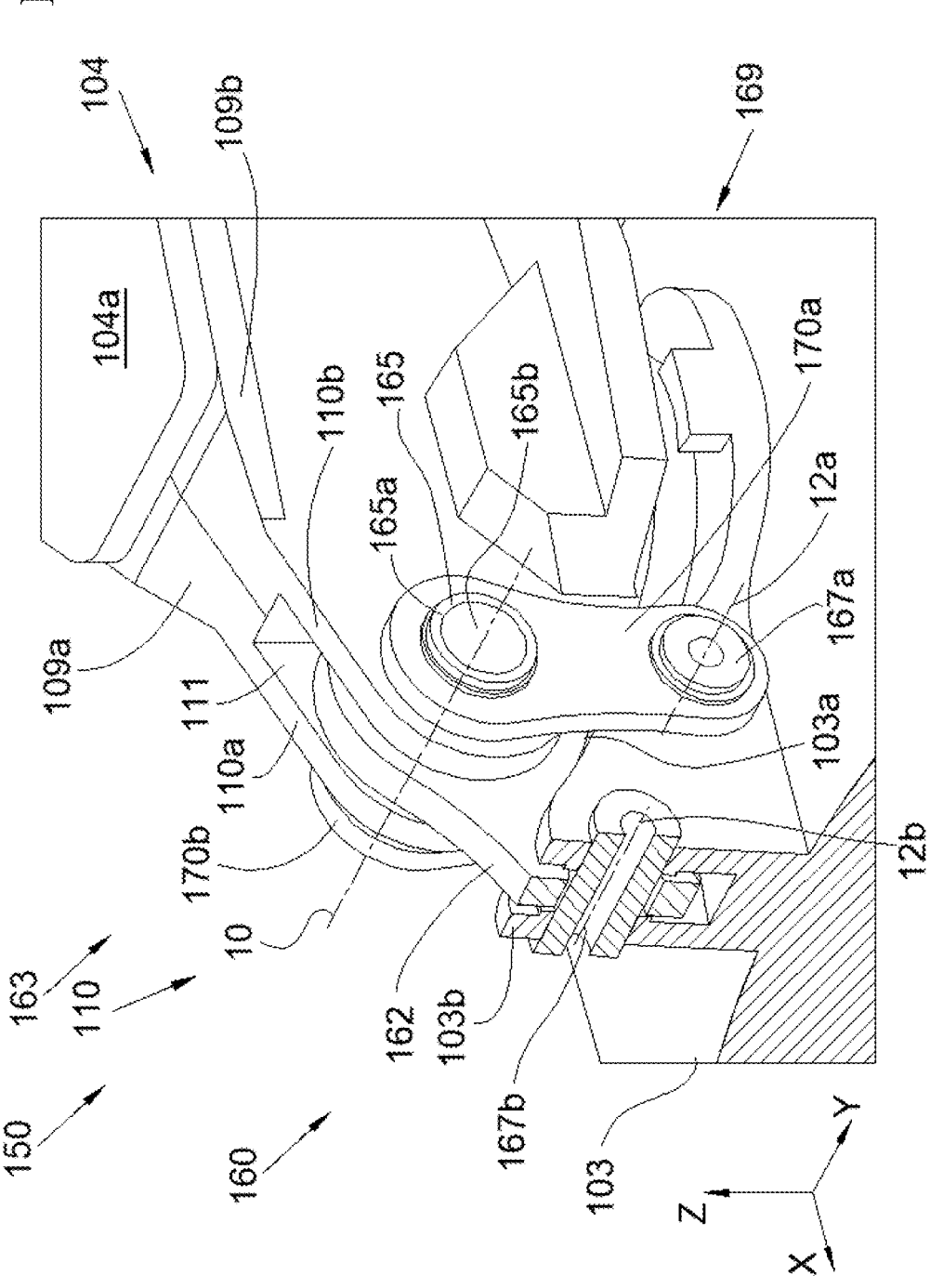
FIG. 3 is a perspective view of a cross section of the front engine attachment system according to the invention along the line III in FIG. 2.

FIG. 3 shows a cross section through the second female clevis 103b.

The main link 162 is therefore in this case a link with three fastening points.

The main female clevis 111 is arranged to the rear of the second female clevis 103b with respect to the longitudinal direction X, i.e. the main axis 10 of the main ball-joint connection is to the rear of the pivot axis 12b of the pivot connection.

The second shaft 167b is mounted with a tight fit in the bores in the second female clevis 103b and with clearance in the bore in the main link 162. Thus, in certain failure cases, the main link 162 and/or second shaft 167b will move in order to bring the inner wall of the bore in the main link 162 against the second shaft 167b.

In the embodiment of the invention presented in FIG. 5, in the event of failure at the spigot connection 169, it is necessary to continue to transmit the forces in the Y direction. Thus, according to one particular embodiment of the invention, the nose 110 then has two lateral stops 512a-b, which are arranged respectively on the port side and on the starboard side of the outer cylinder 504, and, for each lateral stop 512a-b, the front casing 103 has a lateral counter-stop 510a-b and the two lateral counter-stops 510a-b are also arranged respectively on the port side and on the starboard side of the outer cylinder 504 and the lateral stops 512a-b are arranged between the lateral counter-stops 510a-b.

In the normal position, i.e. without failure of the primary force path, each lateral stop 512a-b is at a distance from the associated lateral counter-stop 510a-b, and in the event of failure, one of the lateral stops 512a-b comes to bear against the associated lateral counter-stop 510a-b.

In the embodiment of the invention presented in FIG. 6, in the event of breakage at the outer cylinder 504, the inner cylinder 505 takes over and thus forms a backup safety means (or "waiting fail-safe" means).

In the event of failure, it is necessary to continue to transmit the forces in the Z direction. Thus, according to one particular embodiment of the invention, the front engine attachment system 150 has two lateral links 170a-b arranged respectively on the port side and on the starboard side of the main link 162, and in the embodiment of the invention presented in FIGS. 2 to 4, respectively on the port side and on the starboard side of the walls 110a-b forming the main female clevis 111 and symmetrically with respect to the median plane XZ.

Each lateral link 170a-b is mounted on the main shaft 165 with a tight fit and on the secondary shaft 167a with clearance. Thus, in certain failure cases, at least one lateral link 170a-b and/or the secondary shaft 167a will move in order to bring the inner wall of the bore in said at least one lateral link 170a-b against the secondary shaft 167a.

In the embodiment of the invention presented in FIGS. 2 to 4, the main shaft 165 consists of a peripheral shaft 165a, which is cylindrical and hollow, and of an inner shaft 165b, which is housed in the peripheral shaft 165a. Such an arrangement makes it possible to compensate for any breakage of the peripheral shaft 165a.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front engine attachment system for an engine of an aircraft, the front engine attachment system having a vertical median plane, where the vertical median plane is an XZ plane in a coordinate system where X denotes a longitudinal direction of the engine with positive orientation in the direction of forward movement of the aircraft, Y denotes a transverse direction of the engine, and Z denotes a vertical direction of the engine and comprising:

an engine pylon having, at a front part, a nose having a main female clevis, and a cylindrical housing around a vertical axis, a main link configured to be fastened to a front casing of the engine by a secondary ball-joint connection about a secondary axis perpendicular to the vertical median plane by a secondary shaft, a main shaft, which is perpendicular to the vertical median plane and which forms a main ball-joint connection of the main link in the main female clevis about a main axis, wherein the main axis and the secondary axis are in the same vertical plane perpendicular to the vertical median plane, and an outer cylinder, which is coaxial with the vertical axis and a first end of which is fastened in the cylindrical housing and a second end of which is configured to be mounted, via an annular linear connection, around the vertical axis with respect to the front casing.

2. The front engine attachment system according to claim 1, wherein a location of the main axis is arranged in front of a location of the vertical axis.

3. The front engine attachment system according to claim 1, wherein the main link is configured to be fastened to a second female clevis of the front casing by a pivot connection about a pivot axis perpendicular to the vertical median plane, wherein the front engine attachment system further comprises a second shaft forming the pivot connection, and wherein the second shaft is mounted with clearance in a bore in the main link and configured to be mounted with a tight fit in bores in the second female clevis.

4. The front engine attachment system according to claim 1, wherein the nose has two lateral stops, which are arranged respectively on a port side and on a starboard side of the outer cylinder and are configured to come between two lateral counter-stops of the front casing.

5. The front engine attachment system according to claim 1, further comprising:

two lateral links arranged respectively on a port side and on a starboard side of the main link, and wherein each lateral link is mounted on the main shaft with a tight fit and on the secondary shaft with clearance.

6. The front engine attachment system according to claim 1, wherein the main shaft comprises a peripheral shaft, which is hollow, and an inner shaft, which is housed in the peripheral shaft.

7. An aircraft comprising:

a structure, an engine with a front casing, the front engine attachment system according to claim 1, wherein the main link is fastened to the front casing by the secondary ball-joint connection, and wherein the second end of the outer cylinder is mounted, via the annular linear connection, around the vertical axis with respect to the front casing.

* * * * *